(12) United States Patent
Hwang (10) Patent No.: US 6,181,779 B1
(45) Date of Patent: *Jan. 30, 2001

(54) RATIONALIZED AUTOMATED ANSWERING MACHINE

(75) Inventor: Bar-Chung Hwang, Taoyuan (TW)

(73) Assignee: Winbond Electronics Corporation, Hsinchu (TW)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/785,781

(22) Filed: Jan. 21, 1997

(30) Foreign Application Priority Data

Nov. 11, 1996 (TW) ................................. 85217286

(51) Int. Cl.$^7$ ............................................ H04M 1/64
(52) U.S. Cl. ............. 379/67.1; 379/72; 379/88.04; 379/88.18; 379/93.01
(58) Field of Search .................... 379/67, 88, 89, 379/67.1, 72, 76, 77, 88.01, 88.04, 88.13, 88.17, 88.27, 93.01, 93.02, 93.24, 93.26

(56) References Cited

U.S. PATENT DOCUMENTS

| | | |
|---|---|---|
| 4,617,425 * 10/1986 | Nakamura et al. | 379/77 |
| 4,757,525 * 7/1988 | Matthews et al. | 379/89 |
| 4,922,520 * 5/1990 | Bernard et al. | 379/88 |
| 5,117,451 * 5/1992 | Ladd et al. | 379/67 |
| 5,128,982 * 7/1992 | Dugdale et al. | 379/88.24 |
| 5,146,487 * 9/1992 | Bergsman et al. | 379/67 |
| 5,400,393 * 3/1995 | Knuth et al. | 379/88 |
| 5,524,140 * 6/1996 | Klausner et al. | 379/67 |
| 5,568,539 * 10/1996 | Bergsman et al. | 379/88.22 |
| 5,633,909 * 5/1997 | Fitch | 379/15 |
| 5,692,213 * 11/1997 | Goldberg et al. | 395/806 |
| 5,771,276 * 6/1998 | Wolf | 379/88 |
| 5,822,405 * 10/1998 | Astarabadi | 379/88 |

* cited by examiner

*Primary Examiner*—Krista Zele
*Assistant Examiner*—Allan Hoosain
(74) *Attorney, Agent, or Firm*—Ladas & Parry (57) ABSTRACT

A rationalized automated answering machine which can distinguish sentence intervals in the Out Going Message (OGM) left by a host by using a microcomputer and record the space position between adjacent sentences of the Out Going Message. When the rationalized automated answering machine receives a call and plays the Out Going Message left by the host, the rationalized automated answering machine also monitors the sound of a caller simultaneously. If the caller interrupts in the OGM playback at any point, the Out Going Message playback stops immediately and the rationalized automated answering machine records the sound of the caller. After talk from the caller finishes, the Out Going Message playback continues.

2 Claims, 7 Drawing Sheets

RATIONALIZED AUTOMATED ANSWERING MACHINE

BACKGROUND OF THE INVENTION

1. Field of the Invention

The invention relates to an automated answering machine, in particular to a rationalized automated answering machine which can adjust the playback of an Out Going Message (OGM) left by a host according to the talk pattern of a caller.

2. Description of Related Art

Figure 1:
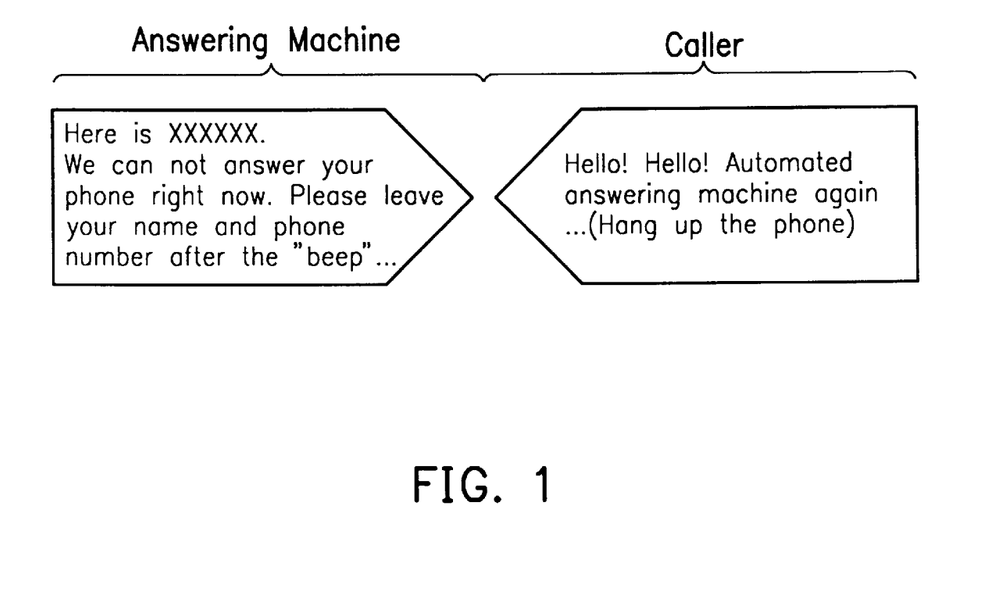
FIG. 1 is a schematic chart showing a question-and-answer situation between a prior automated answering machine with Out Going Message (OGM) and a caller.

In a conventional automated answering machine, a prerecorded Out Going Message (OGM) is played before which the caller can be prompted to leave a message following a "beep". When the caller calls in and a host/user can not answer the phone, the caller's left message is recorded by an magnetic tape or a digital IC. FIG. 1 presents a schematic view showing the question-answer situation of a prior automated answering machine in which the left side of the schematic depicts a typical prerecorded voice prompt or Out Going Massage (OGM) from the automated answering machine, while the right side depicts talk from the caller. Typically, the caller may feel impatient and irritated when hearing the Out Going Message left by the host after the telephone is on line. The caller may also be not familiar with leaving messages after a beep sound. Moreover, since the caller can not interrupt the OGM at all before a beep sound in prior automated answering machines, many callers unfamiliar with such machines tend to hang up the phone after realizing that the voice prompt is just an Out Going Message from the automated answering machine. Other callers cannot be bothered to wait until the completion of the OGM. This prevents the automated answering machine from being utilized to accomplish its purpose in relaying messages.

SUMMARY OF THE INVENTION

Therefore, the object of the invention is to provide a rationalized automated answering machine that distinguishes each sentence interval in the Out Going Message (OGM) by using a microcomputer and records space positions between adjacent sentences. When the rationalized automated answering machine receives a call and plays the Out Going Message, the sound of a caller may be monitored simultaneously. If the caller interrupts at any point during the playing of the OGM, the Out Going Message playing stops immediately and a message left by the caller is recorded. And yet, the Out Going Message is played continuously after talk from the caller finishes. In this way, the caller does not have to wait until the Out Going Message finishes playing before talking, thereby avoiding caller irritation and impatience.

Another object of the invention is to provide the function of filtering select so that the users can set the rationalized automated answering machine to only record messages left by the caller or record all messages after the telephone is on line. To the caller who is not familiar with leaving a message, the host can recognize the sound of the caller, such as "hello, hello . . . " to distinguish the caller and then call back later.

The rationalized automated answering machine of the invention includes a telephone line interface circuit which services as the interface between a ring line and a tip line and an internal circuit; a ringing detector which checks the number of rings; a hybrid circuit dividing connecting ends of the telephone line interface circuit into an input end and an output end; a sound input selector connected to the output end of the hybrid circuit and a microphone, for selecting a source of sound input; a sound output selector connected to the input end of the hybrid circuit and an amplifier for selecting output position of sound; a sound coder connected to the sound input selector to code input sound; a memory for saving sound data coded by the sound coder; a sound decoder for decoding sound data inside the memory and then delivering the sound data to the sound output selector; a signal input detector for checking sound situations from the caller; and a processor for distinguishing each sentence position of the Out Going Message left by a host and controlling the playback modes of the Out Going Message according to the checking result of the signal input detector;

The rationalized automated answering machine of the invention mentioned above can simply distinguish the discrete sentences of the Out Going Message left by the host by using a microcomputer and record space positions between adjacent sentences. When the rationalized automated answering machine receives a call and plays the Out Going Message left by the host, the rationalized automated answering machine also monitors the sound from the caller simultaneously. If the caller interrupts the playing of the Out Going Message, the playback of the Out Going Message stops immediately and the rationalized automated answering machine records the sound of the caller. After the caller finishes talking, the Out Going Message playing is restarted. Moreover, when each sentence of Out Going Message finishes playing, the rationalized automated answering machine will wait for a message from the caller and if no message from the caller is received over a period time, the Out Going Message will continue playing.

BRIEF DESCRIPTION OF THE DRAWINGS

The objectives, characteristics and advantages of the invention will be explained by using a preferred embodiment with pertinent drawings as follows:

FIG. 4 (4a and 4b) is a flow chart of the rationalized automated answering machine of the invention;

DETAILED DESCRIPTION OF THE INVENTION

Figure 2:
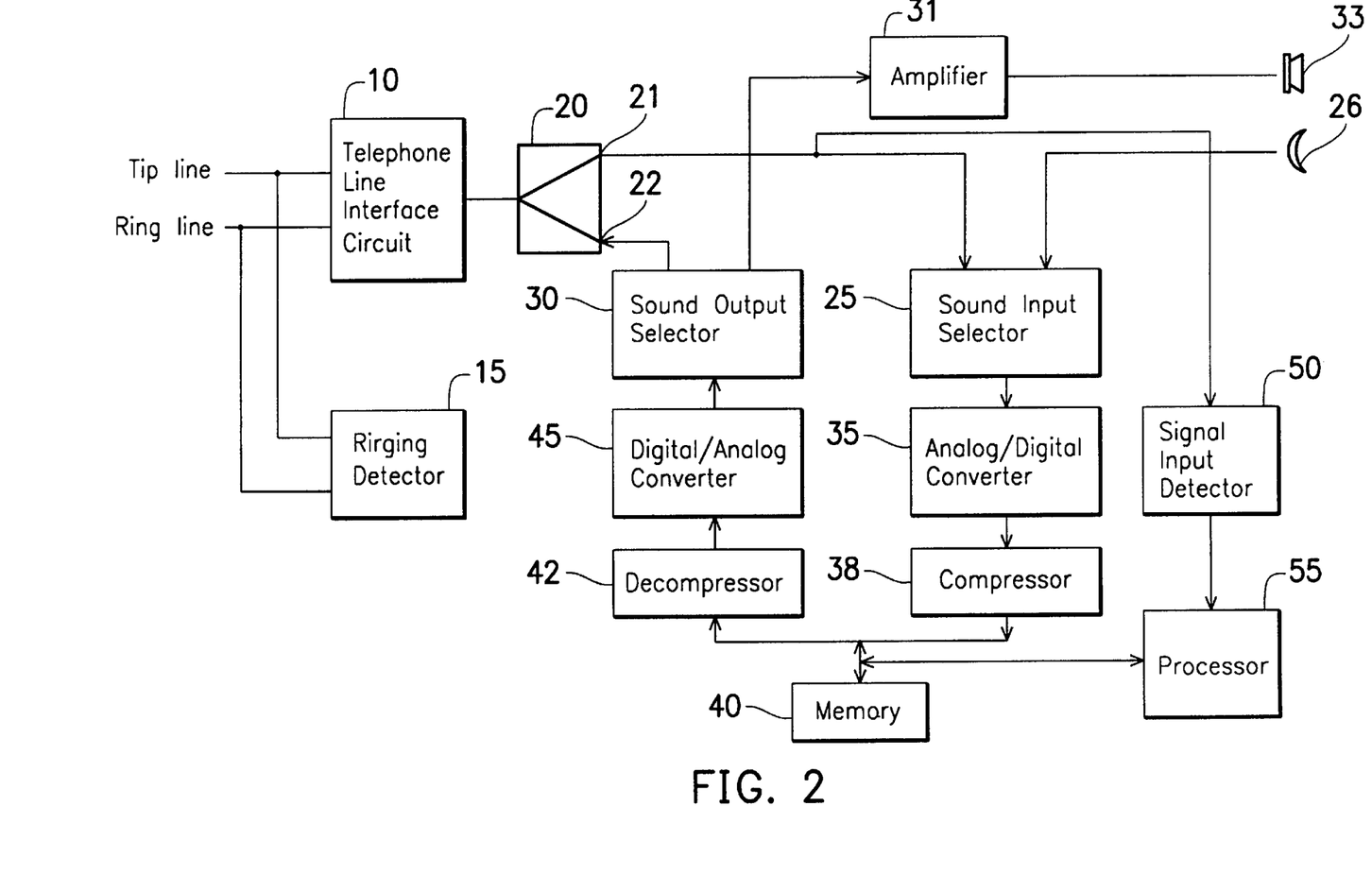
FIG. 2 is a block diagram showing the rationalized automated answering machine structure of the invention.

Referring to FIG. 2, the rationalized automated answering machine of the present invention is shown. Telephone line interface circuit 10 serves as the interface between a ring line and a tip line and an internal circuit. Ringing detector 15 checks a ringing number. Hybrid circuit 20 divides connecting ends of the telephone line interface circuit into input end 22 and output end 21. Sound input selector 25 is connected to output end 21 of the hybrid circuit and microphone 26 respectively for electing a source of the sound input. Sound output selector 30 is connected to input end 22 of hybrid circuit and amplifier 31 for selecting a position of the sound output to speaker 33. Analog-to-digital converter 35 is connected to sound input selector 25 to digitize the input sound and then transfer the input sound by u-law or a-law. Compressor 38 compresses digitized data resulting in the memory capacity saving. Memory 40, for example, a Random Access Memory, saves sound data processed by compressor 38. Decompressor 42 decompresses the sound data saved in memory 40. Digital-to-analog converter 45 restores the decompressed sound data from the decompressor by u-law or a-law, converts the sound data to analog sound, and then delivers the sound data to sound output selector 30. Signal input detector 50 checks the sound situation of the caller. Processor 55, for example, a 8051 chip, distinguishes each sentence position of the Out Going Message left by the host and controls the playing modes of the Out Going Message according to the checking result of signal input detector 50. Analog-to-digital converter 35 and digital-to-analog converter 45 may be a TP 3054 chip manufactured by National Semiconductor Company in U.S.A. Compressor 38 and decompressor 42 may be a W62401 chip manufactured by Winbond Electronic Corporation in Taiwan.

Based upon the description of the rationalized automated answering machine structure of the invention above, signal input detector 50 checks whether the caller is talking or not. Sound input selector 25 is switched to the microphone only when the host/user records an Out Going Message. Sound output selector 30 is switched to a speaker only when the host/user plays a left message.

Figure 3A:
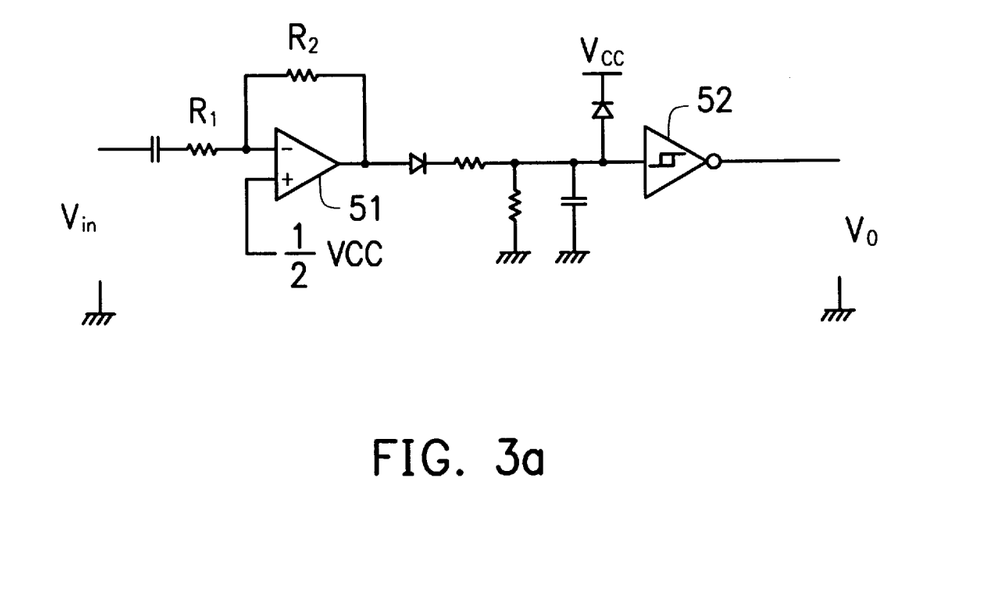
FIG. 3a is a schematic view showing a signal input detector circuit of the embodiment of the invention.
Figure 3B:
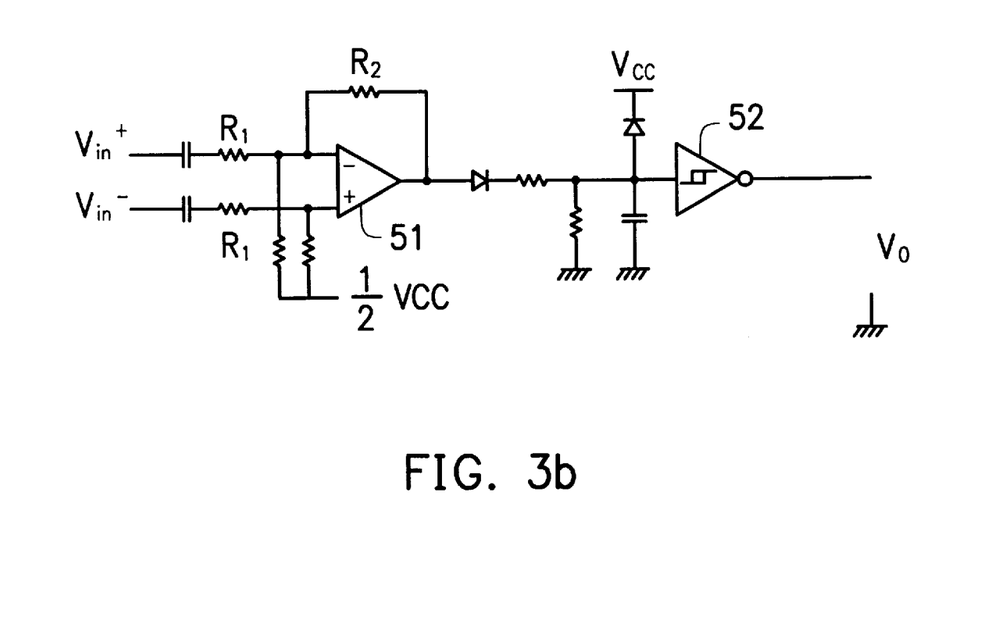
FIG. 3b is a schematic view showing a signal input detector circuit of the other embodiment of the invention.

Referring to FIGS. 3a and 3b, FIG. 3a is a schematic view showing an embodiment of the invention in which signal input detector circuit 50 has a unipolar signal input, while FIG. 3b is a schematic view showing an embodiment of the invention in which signal input detector circuit 50 has a balanced differential signal input. The two circuits each include operational amplifier 51 and output amplifier 52, wherein amplifier 51 can work under a signal power source and R1 and R2 are used to adjust the checking point of signal input detector 50. When the signals are inputted, $V_0$ becomes 0 volt. Otherwise, $V_0$ still remains high.

Figure 4A:
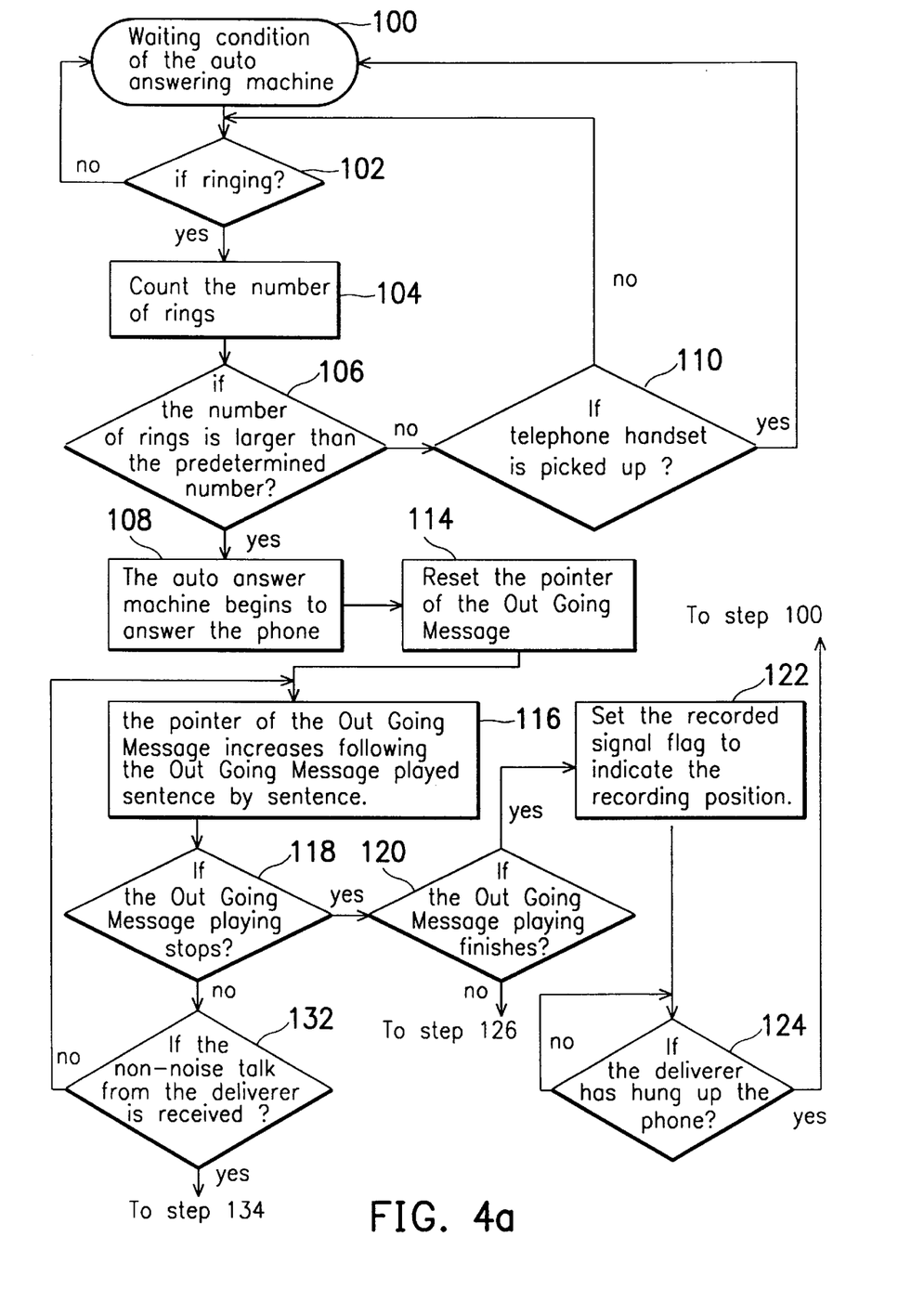
Figure 4B:
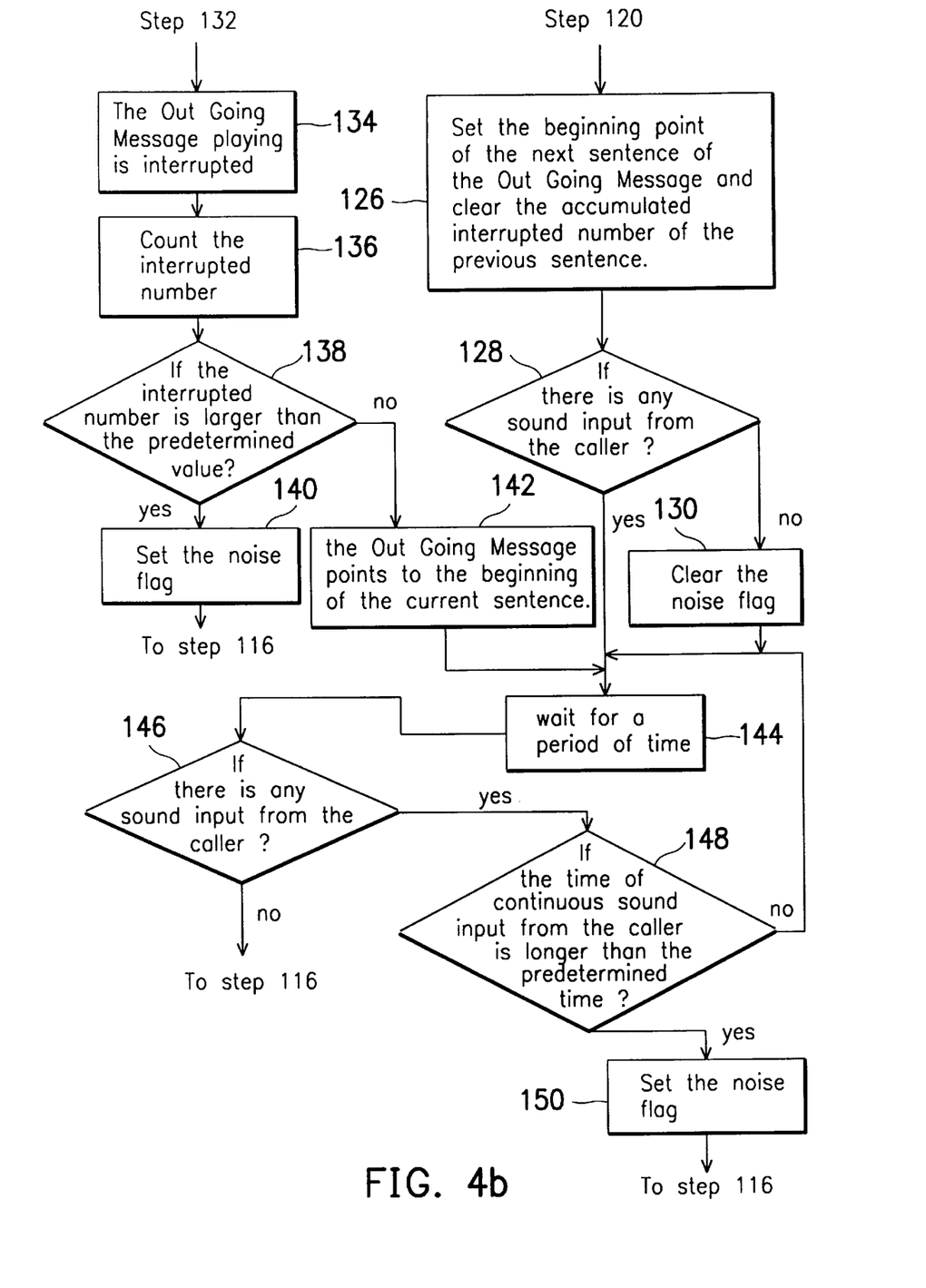

Referring to FIGS. 4a and 4b, the flow chart of the rationalized automated answering machine of the present invention includes the following steps:

(1) Step 100: The rationalized automated answering machine is in a waiting condition.
(2) Step 102: Check if ringing is taking place and then proceed to next step if yes, otherwise return to step 100.
(3) Step 104: Count the number of rings.
(4) Step 106: Check if the ringing number is larger than a predetermined number and then proceed to step 108 if yes, otherwise proceed to step 110.
(5) Step 108: The rationalized automated answering machine answers the phone and proceeds to step 114.
(6) Step 110: Check if telephone handset is picked up and then return to step 100 if yes, otherwise proceed to step 102.
(7) Step 114: Reset the pointer of the Out Going Message.
(8) Step 116: The pointer of Out Going Message increases as the Out Going Message is played sentence by sentence.
(9) Step 118: Check if the Out Going Message playing is stopped and then proceed to step 120 if yes, otherwise proceed to step 132.
(10) Step 132: Check if non-noise talk from the caller is detected and then proceed to step 134 if yes, otherwise return to step 116.
(11) Step 134: The playback of the Out Going Message playing is interrupted.
(12) Step 136: Count an interrupt number.
(13) Step 138: Check if the interrupt number is larger than a predetermined value and then proceed to step 140 if yes, otherwise proceed to step 142.
(14) Step 140: Set a noise flag and then return to step 116.
(15) Step 142: Point the Out Going Message to the beginning of current sentence and then proceed to step 144.
(16) Step 120: Check if the Out Going Message playing has finished and then proceed to step 122 if yes, otherwise proceed to step 126.
(17) Step 122: Set a recorded signal flag to indicate the recording position.
(18) Step 124: Check if the phone has been hung up and then return to step 100 if yes, otherwise proceed to step 124.
(19) Step 126: Set the beginning point of next sentence of the Out Going Message and clear an accumulated interrupted number of the previous sentence.
(20) Step 128: Check if there is any sound input from the caller and then proceed to step 144 if yes, otherwise proceed to step 130.
(21) Step 130: Clear the noise flag and then proceed to step 144.
(22) Step 144: Wait for a period of time and then proceed to step 146.
(23) Step 146: Check if there is any sound input from the caller and then proceed to step 148 if yes, otherwise return to step 116.
(24) Step 148: Check if the time of sound input from the caller is larger than the predetermined time and then proceed to step 150 if yes, otherwise returns to step 144.
(25) Step 150: Set the noise flag.

In the flow chart mentioned above, the rationalized automated answering machine will return to a waiting condition if the phone is hung up.

Furthermore, the rationalized automated answering machine has the following characteristics according to the flow chart:

(1) In steps 126 and 142, the processor can control the reading of the memory and thereby the Out Going Message can be played from the beginning of each sentence. (2) In steps 118, 132, 134, 136, 138,142,144 and 146, when talk from the caller is checked by the signal input detector, the processor will stop playing the Out Going Message and record the message left by the caller. After talk from the caller finishes, the interrupted sentence of the Out Going Message is played continuously from the beginning. (3) In step 128, 130, 144, and 146, the processor controls playing speed of the Out Going Message, i.e., the Out Going Message playing stops during a period of time between adjacent sentences of the Out Going Message, but the playing will be continuous when a waiting time exceeds the period of time. (4) Using steps 136, 138, and 140, the processor can set a predetermined number and if the replaying number of the same interrupted sentence of the Out Going Message is larger than the predetermined number, the processor may ignore the influence of the signal input detector and keep playing the interrupted sentence. (5) In steps 148 and 150, the processor can set a predetermined time. If background noise is too loud, the input signal detector may keep checking sound input from the caller and if the time of the continuous sound input is larger than the predetermined time, the processor may continue to complete playing the sentence of the Out Going Message. After the sentence playing finishes, the processor will distinguish if the signal input is background noise.

The rationalized automated answering machine can record all sound input from the caller according to the checking result of the signal input detector or only record messages left by the caller according to predetermined processes. When the host/user sets the recording mode as "Recording All", the recording will start, once the caller begins to talk. Otherwise, the recording does not start until the Out Going Message playing finishes.

Figure 5:
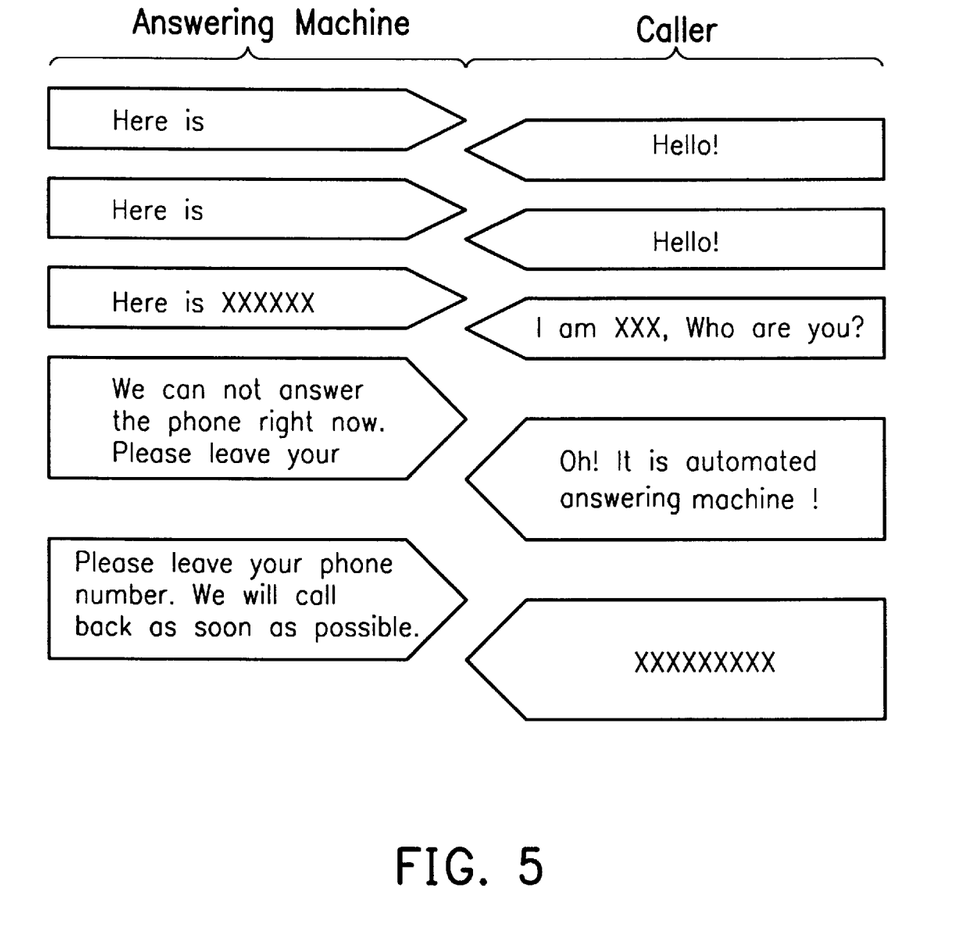
FIG. 5 is a schematic chart showing the question-and-answer situations of the embodiment of the invention.

Referring to FIG. 5, there is presented a schematic view showing the question-answer situation of the automated answering machine in which the left side of the schematic depicts talk from the automated answering machine, while the right side depicts talk from the caller. When the Out Going Message is played, if the caller interrupts in at any point, the playback of the Out Going Message stops and after talk from the caller finishes, Out Going Message continues playback. This makes the caller feel respected and prevents an conflict between the Out Going Message and talk from the caller.

Figure 6:
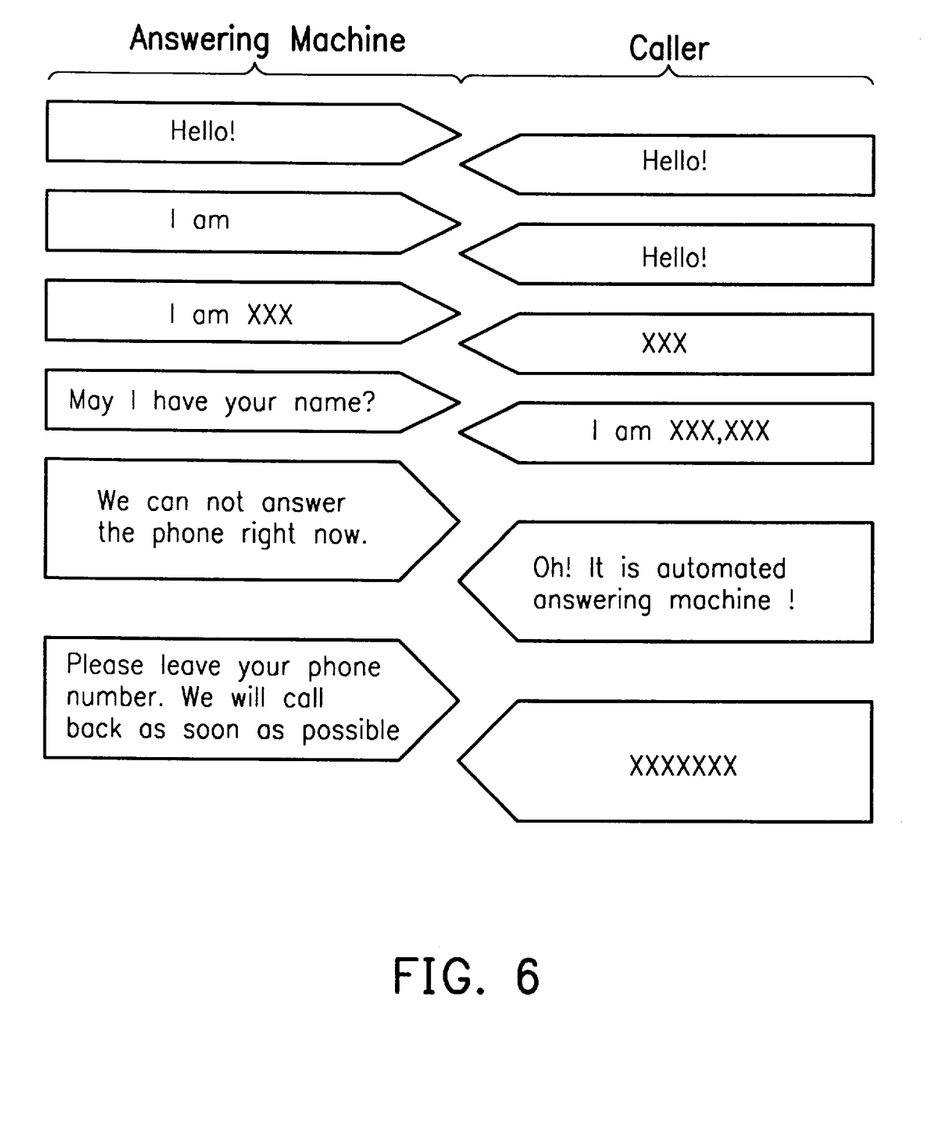
FIG. 6 is a schematic chart showing the question-and-answer situations of the other embodiment of the invention.

Referring to FIG. 6, there is similarly presented a schematic view showing the question-answer situation of the automated answering machine of the present invention. The host/user can pre-record the Out Going Message by using a simple question-and-answer routine, thereby allowing the caller to hold a conversation with the rationalized automated answering machine. The caller may come to realize that he is merely talking to an automated answering machine. Based on the description above, the rationalized automated answering machine can accomplish the objective of having the caller leave messages and raise public acceptance of such automated machines. Having described the invention in connection with a preferred embodiment thereof, modification will now suggest itself to those skilled in the art. As such, the invention is not to be limited to the disclosed embodiment except as is specifically required by the appended claims.

What is claimed is:

1. A rationalized automated answering machine comprising:

a signal input detector for sensing sounds provided by a caller;

a memory for recording a message left by the host and storing sound data; and a processor for controlling the playback of sentences included in the message prerecorded in memory and stopping the playback of the sentences a soon as said signal input detector determines that the caller has emitted a sound and then recording the sound emitted by the caller, said processor counting a number of times that a given interrupted sentence is replayed to said caller and if said number exceeds a predetermined number then said processor ignores said signal input detector and allows the given interrupted sentence to be played without further interruption by the caller.

2. A rationalized automated answering machine comprising:

a signal input detector for sensing sounds provided by a caller;

a memory for recording a message left by the host and storing sound data; and a processor for controlling the playback of sentences included in the message prerecorded in memory and stopping the playback of the sentences a soon as said signal input detector determines that the caller has emitted a sound and then recording the sound emitted by the caller and if background noise is too loud, said input signal detector continues to sense for sounds from the caller and, if the noise continues for a period of time longer than a predetermined period of time, then said processor ignores said signal input detector and allows the message sentence to continue playing.

\* \* \* \* \*